S. G. WALKER.
AUTOMOBILE SIGNALING DEVICE.
APPLICATION FILED AUG. 14, 1917.
1,304,423.
Patented May 20, 1919.
2 SHEETS—SHEET 1.
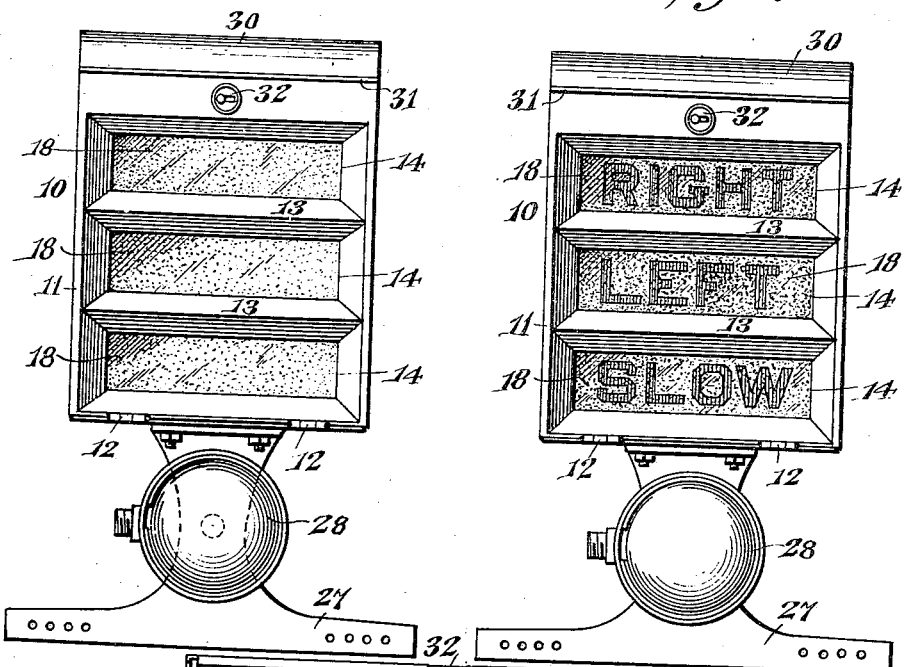
WITNESSES
INVENTOR
S. G. Walker,
BY
ATTORNEY

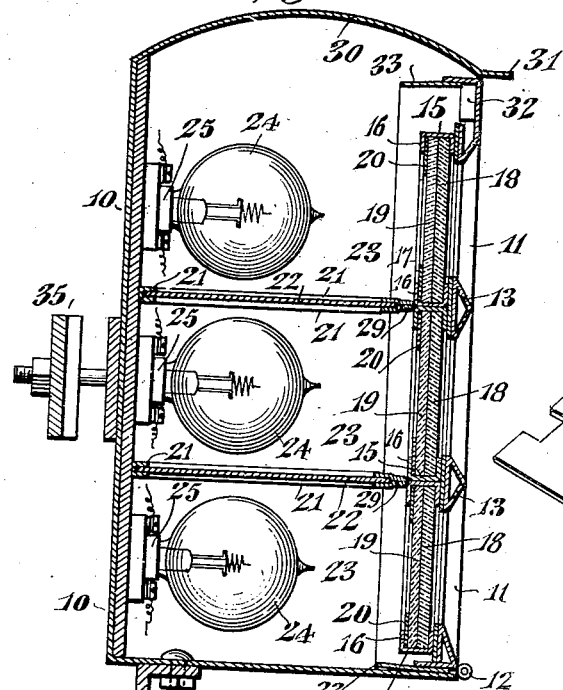
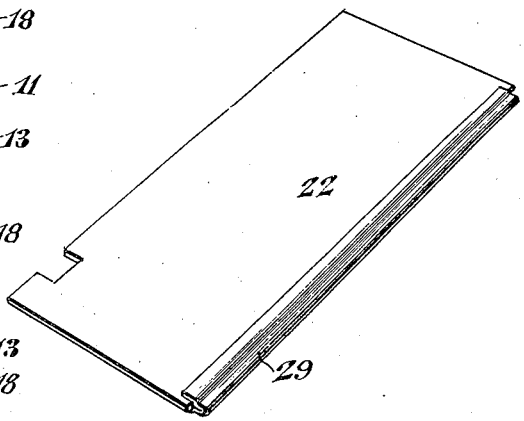
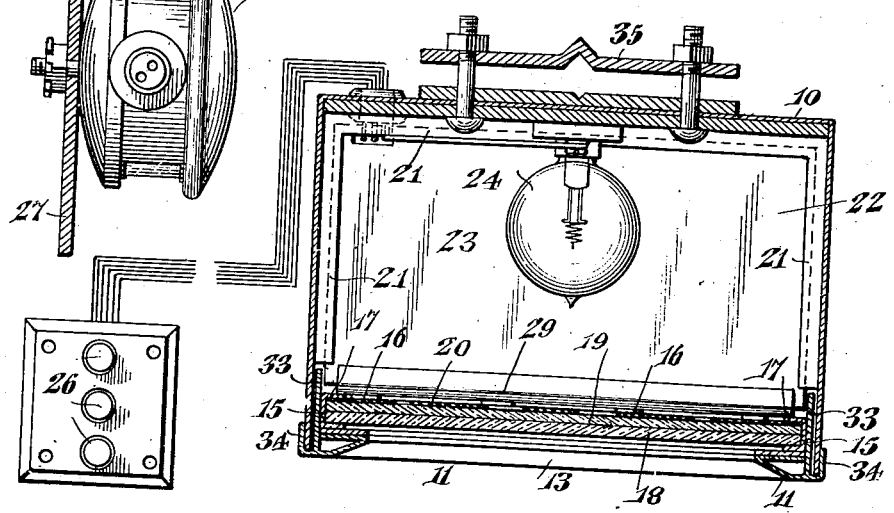

UNITED STATES PATENT OFFICE.

STURGES G. WALKER, OF MEMPHIS, TENNESSEE.

AUTOMOBILE SIGNALING DEVICE.

1,304,423.  Specification of Letters Patent.  Patented May 20, 1919.

Application filed August 14, 1917. Serial No. 186,194.

*To all whom it may concern:*

Be it known that I, STURGES G. WALKER, a citizen of the United States, residing at Memphis, in the county of Shelby and State of Tennessee, have invented a new and useful Automobile Signaling Device, of which the following is a specification.

The invention relates to signal devices for vehicles, and more particularly to the class of automobile illuminated signaling devices.

The primary object of the invention is the provision of a device of this character, wherein different signals will be visible at night or day from the rear end of an automobile to enable traffic following the same to determine the direction or course of travel of said automobile or the speed of the same, thereby eliminating rear end collisions or otherwise damage to mobile traffic or injury to pedestrians.

Another object of the invention is the provision of a signaling device of this character, wherein the same is rendered watertight to avoid damage thereto during rainy weather.

A further object of the invention is the provision of a signaling device of this character, which is extremely simple in construction, under the control of the operator of the automobile, thoroughly reliable and efficient in its operation, neat and attractive in appearance, and inexpensive in manufacture and installation.

The invention will be best understood from a consideration of the following detail description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is an elevation of a signaling device constructed in accordance with the invention, showing a tail light and license holder thereon.

Fig. 2 is a view similar to Fig. 1, showing the signals visible.

Fig. 3 is an enlarged vertical transverse sectional view, through the signaling device.

Fig. 4 is a horizontal sectional view, showing the electric push button switches for controlling the illumination of the lamps in the device.

Fig. 5 is a detail view, looking toward the inner side of the front door of the device.

Fig. 6 is a perspective view of one of the removable partitions showing in detail the flexible light closure strip thereon.

Similar reference characters indicate like parts throughout all the figures in the drawings.

Referring to the drawings in detail, 10 designates a casing, preferably made from sheet metal, and, in this instance, is of rectangular shape to constitute a box like body, although it may be of any other desirable shape and is open at its front for receiving a door, hereinafter fully described.

The door comprises a frame 11, supported upon hinges 12, at its lower end and connected to the casing or body 10 for the swinging of the door to open or closed position. The frame 11 of the door has formed in its open center spaced transversely extending cross pieces 13, dividing the open center into a plurality of elongated openings 14, which are of uniform size with respect to each other and interiorly of this frame 11 are secured panel frames 15, the same registering with the openings 14, and each is provided with bendable tongues or ears 16 and 17, respectively, the ears 17 being located at the ends of the frame, while the ears 16 are at the sides thereof. In each of these frames 15 are received the outer ground glass panel 18 and the inner colored glass panel 19, the latter being preferably colored red, although the same may be of any other hue, while on the inner face of the panel 19 is a suitable coating 20, preferably black, stenciled or otherwise, to provide a signal or indicator word, visible through the panel 19 and constitutes a danger signal. The panel 18, which is translucent or semi-opaque covers the panel 19, so as to normally conceal the signal or indicating word provided thereon. The outer and inner panels 18 and 19 are removably held in the frames 15 by bending the ears 16 and 17 inwardly and downwardly, as clearly shown in Fig. 5 of the drawings, so that the panels in the series will be securely held in the frame 11 of the door.

The front panels 18 in the series effect an outer wall to the door, while the inner panels 19 in their series constitute an inner wall and in the arrangement of these panels the uppermost one has provided thereon the word "Right," as shown in Fig. 2 of the drawings, while the intermediate panel has provided the word "Left," and the lowermost panel has provided thereon the word "Slow." To prevent these direction indicating words from being seen or visible when the automobile is about to stop or turn, the translucent or semi-opaque panels 18 obscure the same until illumination takes place interiorly of the casing or body 10, wherein the light will be thrown not only through the transparent portions of the inner panels 19, but also through the translucent or semi-opaque panels 18, thereby exhibiting the direction indicating words to make the same visible exteriorly of the signaling device.

Arranged interiorly of the casing or body 10 on the sides and back thereof are spaced horizontally disposed partition cleats or guides 21, in which are removably fitted horizontal partitions 22, which divide the casing or body 10 into separate or independent compartments 23, in which are located electric lamps 24 engaged in the usual sockets 25 secured to the back of the casing or body 10 and are connected in an electric circuit controlled by push button switches 26 to close the circuit for illuminating the selected lamp 24, it being understood, of course, that any one or all of the lamps may be energized by closing one or all of the switches.

In using the device, the operator may close one of the switches to energize one lamp independently of the remaining lamps, thus illuminating a particular direction indicating word as a warning to drivers of vehicles at the rear of the device. For example, before turning to the left, the operator will close two of the switches to illuminate the "slow" signal at the rear and also the "left" signal, thereby making visible these signals to indicate the direction of the vehicle and the reduction of the speed of travel thereof.

Secured to the bottom of the casing or body 10 is a bracket 27 on which is suitably mounted the tail lamp 28, which is of the usual well known construction. This bracket 27 is also adapted for the detachable mounting of a license tag thereon, which is positioned to receive light from the tail lamp 28, so that the license number can be clearly visible from the rear of the automobile, as usual.

Each partition 22 at its front edge carries a flexible strip 29, which extends substantially the length of the partition and is adapted to contact with the inner side of the door for closing off light from one compartment 23 to another, so that when the lamps 24 are illuminated, or energized, the rays of light in one compartment will not conflict with the rays of light in the other compartment, or when one compartment is illuminated and the other is not, the rays in the illuminated compartment will not enter the unlighted compartment. Therefore, it will be seen that each compartment is light-tight.

It will be noted upon reference to Fig. 3 of the drawings, that the flexible strips engage with the door at the junction of the panel frames and panels.

The top 30 of the casing or body 10 is upwardly curved and the edge thereof at the door opening is extended to form a guard 31 to prevent the leaking of the lamp or the entrance of rain therein through the joint between the door and the casing or body 10, while the top 30 will shed water during inclement weather.

The door is provided with a suitable lock 32, for the fastening of the same closed.

The frame 11 of the door at opposite sides thereof is formed with inner and outer flanges 33 and 34, respectively, which receive therebetween the sides of the casing or body 10, the outer flanges 34 being adapted to overlap the outer faces of said sides, while the inner flanges 33 overlap the inner faces of the sides, and in this manner the door will be snugly fitted when closed to avoid rattling or the vibration thereof resultant from shocks and jars incident to the travel of the automobile and also the joint between the door and the casing or body will be practically light-tight.

The translucent or semi-opaque panels 18 serve to obliterate or conceal the direction indicating words when the device is not lighted and also avoids the reading of said words when a bright light or the rays from the sun are directed onto the front of the device, so that the signals will not be visible until the device is lighted interiorly thereof.

The back of the casing or body 10 has mounted thereon a suitable clamp 35 for the detachable securing of the device on the automobile at the rear thereof, yet said device can be otherwise located, if desired.

From the foregoing, it is thought that the construction and manner of operation of the invention will be clearly understood, and, therefore, a more extended explanation has been omitted.

What is claimed is:—

1. In a signaling device, a casing, illuminating means arranged within the casing, a door for the casing, a frame mounted on the door, said frame carrying a colored glass panel, and a ground glass panel exteriorly of the latter, said colored glass panel having a black coating on its inner face with a signal cut out of the said coating, whereby the ground glass panel conceals the signal when the device is not lighted and also avoids reading said signal when a bright light is directed onto the front thereof.

2. In a signaling device, a casing, partitions dividing the casing into independent compartments which are open at one side, lamps located in each compartment, a door for closing the open side of the casing, an outer translucent panel in the door, an inner colored panel having a black coating on its inner face, and stenciled signals cut out of said coating and registering with each compartment of the casing, the signals for each compartment being different.

3. In a signaling device of the character described, a casing having a swinging door at its front, said door comprising a rectangular frame with spaced transversely extending cross pieces dividing the space within the frame into a plurality of elongated openings, panel frames on the interior of the door frame registering with said openings, glass panels arranged within the panel frames, tongues for securing the panels in place, said casing having partitions removably fitted in place and dividing the casing into independent compartments, lamps located in the compartments, and flexible strips at the front end of each partition and extending substantially the length thereof, and contacting with the door at the junction of the panel frames and panels.

4. In a signaling device of the character described, a casing, a door frame fitted in the front of the casing and swingingly connected thereto, cross strips in the door frame for dividing the same into a series of openings, panel frames mounted in the door frame and registering with the respective openings therein, bendable tongues on the panel frames, outer translucent and inner colored panels within each panel frame, and removably secured therein by the bendable ears, danger indicia on the inner panels, partitions arranged horizontally within the casing for dividing the same into independent lamp compartments, lamps located within the compartments, inner and outer side flanges formed on the door frame to overlap the inner and outer faces of the sides of the casing when the door frame is closed, and flexible strips on the outer edges of the partitions and coacting with the door to shut off light from one compartment to another interiorly of the casing.

In testimony, that I claim the foregoing as my own, I have hereto affixed my signature in the presence of two witnesses.

STURGES G. WALKER.

Witnesses:
  J. C. McCleary,
  A. M. Johnston.